United States Patent [19]
Periasamy et al.

[11] Patent Number: 6,065,062
[45] Date of Patent: May 16, 2000

[54] BACKUP PEER POOL FOR A ROUTED COMPUTER NETWORK

[75] Inventors: Ravi Periasamy; Wayne Clark; Frank Bordonaro, all of Cary, N.C.; Ramin Naderi, Saratoga; Kushal A. Patel, Sunnyvale, both of Calif.

[73] Assignee: Cisco Systems, Inc., San Jose, Calif.

[21] Appl. No.: 08/987,899

[22] Filed: Dec. 10, 1997

[51] Int. Cl.$^7$ ................................................. G06F 15/173
[52] U.S. Cl. ........................... 709/242; 709/227; 709/239
[58] Field of Search .................................. 709/227, 238, 709/239, 242, 228, 241, 244; 370/351, 355, 396, 397, 400; 340/825.02, 827, 825.01

[56] References Cited

U.S. PATENT DOCUMENTS

| | | | |
|---|---|---|---|
| 4,905,233 | 2/1990 | Cain et al. ................................ | 370/400 |
| 4,922,486 | 5/1990 | Lidinsky et al. .......................... | 370/60 |
| 5,210,750 | 5/1993 | Nassehi et al. .......................... | 370/85.2 |
| 5,261,060 | 11/1993 | Free ......................................... | 395/200 |
| 5,274,631 | 12/1993 | Bhardwaj .................................. | 370/60 |
| 5,369,686 | 11/1994 | Dutra et al. . | |
| 5,416,769 | 5/1995 | Karol ....................................... | 370/60 |
| 5,440,744 | 8/1995 | Jacobson et al. ........................ | 395/650 |
| 5,446,888 | 8/1995 | Pyne ........................................ | 395/600 |
| 5,473,599 | 12/1995 | Li et al. ................................... | 709/244 |
| 5,473,608 | 12/1995 | Gagne et al. ........................... | 370/85.13 |
| 5,546,549 | 8/1996 | Barrett et al. ........................... | 395/309 |
| 5,561,669 | 10/1996 | Lenney et al. .......................... | 370/60.1 |
| 5,627,822 | 5/1997 | Edmaier et al. ..................... | 340/825.01 |
| 5,634,006 | 5/1997 | Baugher et al. .................... | 395/200.06 |
| 5,649,108 | 7/1997 | Spiegel et al. .......................... | 709/241 |
| 5,719,942 | 2/1998 | Aldred et al. ............................ | 380/49 |
| 5,781,528 | 7/1998 | Sato et al. ............................... | 370/397 |
| 5,787,237 | 7/1998 | Reilly ...................................... | 395/112 |
| 5,854,899 | 12/1998 | Callon et al. ........................... | 709/238 |

OTHER PUBLICATIONS

Designing APPN Internetworks, http://www.cisco.com/univercd/cc/td/doc/cisintwk/igd4/nd2006.htm, Copyright 1989 to 1998, pp. 1 to 39.

IBM Systems Network Architecture Formats, GA27-3136-16, Copyright IBM Corp. 1977, 1996, pp. 1-1 to B24.

Systems Network Architecture IBM APPN Architecture Reference, SC30-3422-04, Copyright International Business Machines Corporation, 1986-1996, pp 1-1 to X43.

Network Working Group, Request for Comments, Data Link Switching: Switch-to-Switch Protocol AIW DLSw RIG: DLSw Closed Pages, DLSw Standard Version 1.0, L. Wells and A. Bartky, Synch Research, Inc. Apr. 1995, pp. 1 to 91.

APPN Networks, Jesper Nilausen, Copyright 1994 by John Wiley & Sons, Ltd., pp. 11–99.

Primary Examiner—Mark H. Rinehart
Assistant Examiner—Marc D. Thompson
Attorney, Agent, or Firm—Cesari and McKenna, LLP

[57] ABSTRACT

Backup peers in an asymmetrically organized computer network are organized into a "pool" of available devices that are activated as necessary. The network comprises a set of remote peers and a set of local peers directly associated with a central computational facility, the local peers facilitating connection between the remote peers and the central facility. During the capabilities exchange, the "primary" local peer to which the remote peer connects provides a list of backup peer devices to the remote peer. If the primary peer fails (or if the rate of message exchange falls below some predetermined threshold), the remote peer can use the backup information to access a backup peer from the pool. The invention allows each backup peer to be assigned to multiple remote peers, with the total number of backup peers determined by aggregate backup utilization (rather than simply assigning an individual backup peer to each primary peer regardless of whether such a high level of redundancy is justified).

45 Claims, 6 Drawing Sheets

BACKUP PEER POOL FOR A ROUTED COMPUTER NETWORK

FIELD OF THE INVENTION

The present invention relates to computer networks and, more particularly, to connections between remote and local routing devices.

BACKGROUND OF THE INVENTION

Data communication in a computer network involves the exchange of data between two or more entities interconnected by communication links and subnetworks. These entities are typically software programs executing on hardware computer platforms, which, depending on their roles within the network, may serve as end stations or intermediate stations. Examples of intermediate stations include routers, bridges and switches that interconnect communication links and subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on the data as it passes through each layer, and the layers communicate with each other by means of the predefined protocols. This design permits each layer to offer selected services to other layers using a standardized interface that shields the other layers from the details of actual implementation of the services.

The lower layers of these architectures are generally standardized and implemented in hardware and firmware, whereas the higher layers are usually implemented in the form of software. Examples of such communications architectures include the Systems Network Architecture (SNA) developed by International Business Machines Corporation, the Internet communications architecture, and the Open Systems Interconnection (OSI) reference model proposed by the International Standards Organization.

Figure 1:
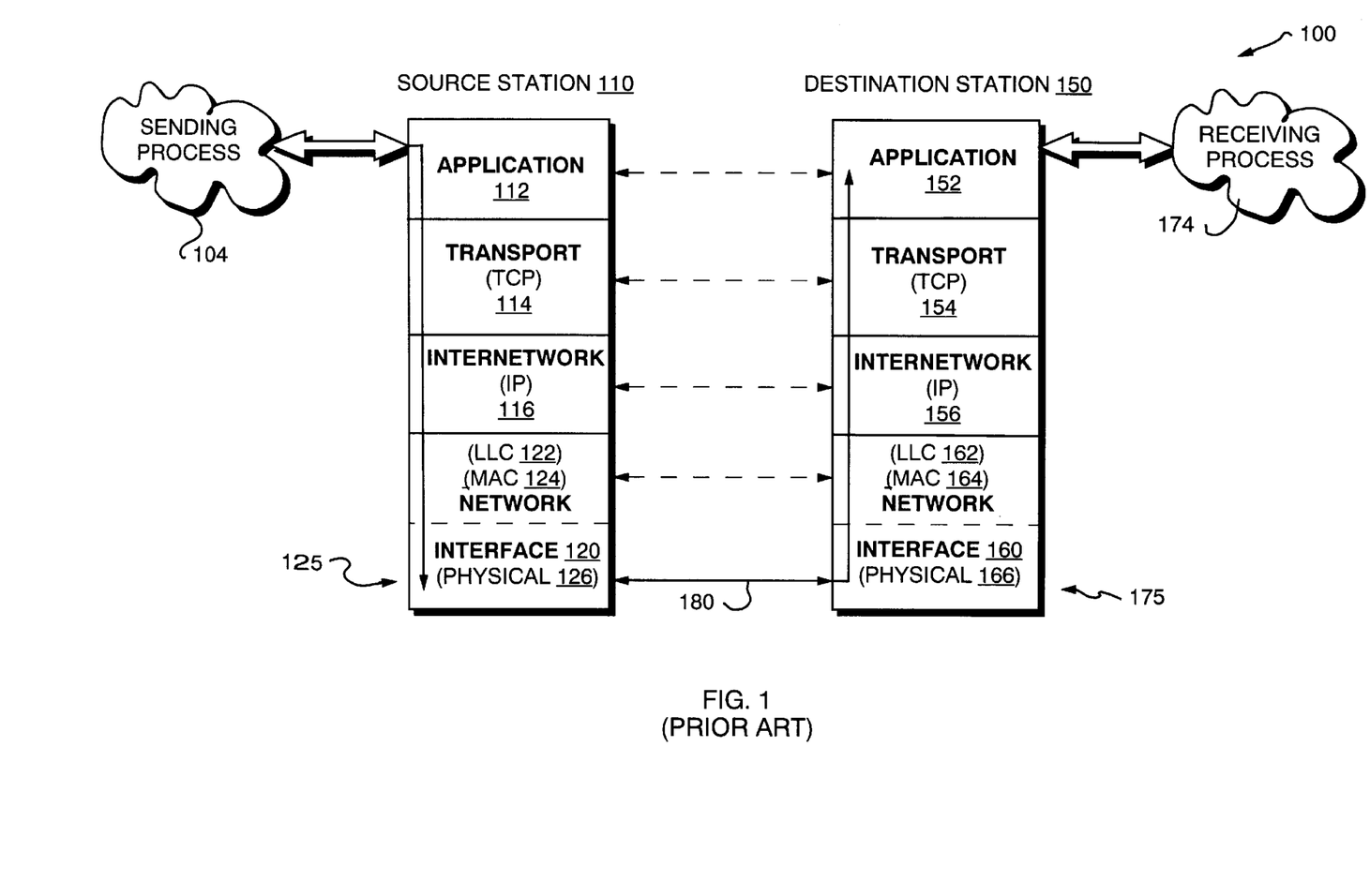
FIG. 1 is a schematic block diagram of prior-art protocol stacks, configured in accordance with the Internet architecture, for transmitting data between a source station and a destination station of a computer network.

The Internet architecture is represented by four layers termed, in ascending interfacing order, the network interface, internetwork, transport and application layers. These layers are arranged to form a protocol stack in each communicating station of the network. FIG. 1 illustrates the manner in which a pair of Internet protocol stacks 125, 175 transmit data between a source station 110 and a destination station 150 of a network 100. The stacks 125, 175 are physically connected through a communication channel 180 at the network interface layers 120 and 160. For exemplary purposes, the following discussion focuses on protocol stack 125.

In general, the lower layers of the protocol stack provide internetworking services and the upper layers, which utilize these services, collectively provide common network application services. The application layer 112 contains a variety of functions commonly needed by software processes executing on the station, while the lower network interface layer 120 of the Internet architecture implements industry standards defining a flexible network architecture oriented to the implementation of LANs.

Specifically, network interface layer 120 comprises physical and data link sublayers. The physical layer 126 controls the actual transmission of signals across the communication channel 180, defining the types of cabling, plugs and connectors used in connection with the channel. The data link layer, on the other hand, is responsible for transmission of data from one station to another and may be further divided into two sublayers: logical link control (LLC) 122 and media access control (MAC) 124. The MAC sublayer 124 is primarily concerned with controlling access to the transmission medium in an orderly manner and, to that end, defines procedures by which the stations must abide in order to share the medium. The LLC sublayer 122 manages communications between devices over a single link of the network and provides for environments that require connectionless or connection-oriented services at the data link layer.

Connection-oriented services at the data link layer generally involve three distinct phases: connection establishment, data transfer and connection termination. During connection establishment, a single path or connection, e.g., an IEEE 802.2 LLC Type 2 or "Data Link Control" (DLC) connection is established between the source and destination stations. Data is then transferred sequentially over the path and, when the DLC connection is no longer needed, the path is terminated. The details of connection establishment and termination are well-known and require no elaboration.

The transport layer 114 and the internetwork layer 116 provide predefined sets of services to aid in connecting the source station to the destination station when establishing application-to-application communication "sessions." The primary network-layer protocol of the Internet architecture is the Internet Protocol (IP), which is contained within the internetwork layer 116. IP is primarily a connectionless network protocol that provides for internetwork routing, fragmentation and reassembly of exchanged frames—usually called "datagrams" in an Internet environment—and which relies on transport protocols for end-to-end reliability. An example of such a transport protocol is the Transmission Control Protocol (TCP), which is contained within the transport layer 114 and provides connection-oriented services to the upper layer protocols of the Internet architecture. The term TCP/IP is commonly used to denote this architecture.

Data transmission over the network 100 therefore consists of generating data in, e.g., a sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150, where they are passed up that stack to a receiving process 174. Data flow is schematically illustrated by solid arrows in FIG. 1.

Although actual data transmission occurs vertically through the stacks, each layer is programmed as though such transmission were horizontal. That is, each layer in the source station 110 is configured to transmit data to its corresponding layer in the destination station 150, as schematically shown by the dashed arrows in FIG. 1. To achieve this effect, each layer of the protocol stack 125 in the source station 110 typically adds information (in the form of a header field) to the data frame generated by the sending process as the frame descends the stack; the header-containing frame is said to be "encapsulated." At the destination station 150, the various headers are stripped off one-by-one as the frame propagates up the layers of the stack 175 until it arrives at the receiving process.

In a typical mainframe-oriented network architecture, applications executing on end stations typically access the network through logical units (LUs), i.e., sets of logical services facilitating communication; accordingly, in such a network, a communication session connects two LUs in a LU—LU session. Activation and deactivation of such a session may be accomplished by Advanced Peer-to-Peer Networking (APPN) functions.

Figure 2:
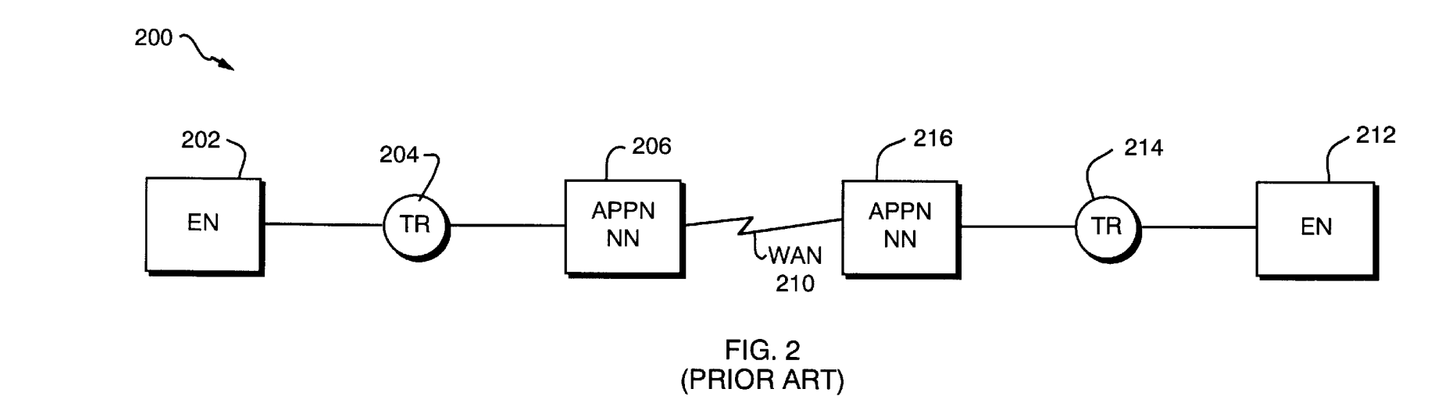
FIG. 2 schematically illustrates the primary components of an APPN network.

The APPN functions generally include session establishment and session routing within an APPN network. FIG. 2 shows a conventional APPN network 200 comprising two end stations 202, 212, which are typically configured as end nodes (ENs), coupled to token ring (TR) subnetworks 204, 214, respectively. During session establishment, an EN (such as EN 202) requests an optimum route for a session between two LUs, i.e., its own and that of the destination station; this route is calculated and conveyed to EN 202.

Intermediate session routing occurs when the intermediate stations 206, 216, configured as APPN network nodes (NNs), are present in a session between the two end nodes. The APPN network nodes are further interconnected by a WAN 210 that extends the APPN architecture throughout the network. The APPN network nodes forward packets of a LU—LU session over the calculated route between the two APPN end nodes. An APPN network node is a full-functioning APPN router having all APPN base service capabilities, including session-services functions. An APPN end node, on the other hand, is capable of performing only a subset of the functions provided by an APPN network node. APPN network and end nodes are well-known and are described in detail in, for example, *Systems Network Architecture Advanced Peer to Peer Networking Architecture Reference* (IBM Doc. SC30-3422) and J. Nilhausen, APPN Networks (1994).

Figure 3:
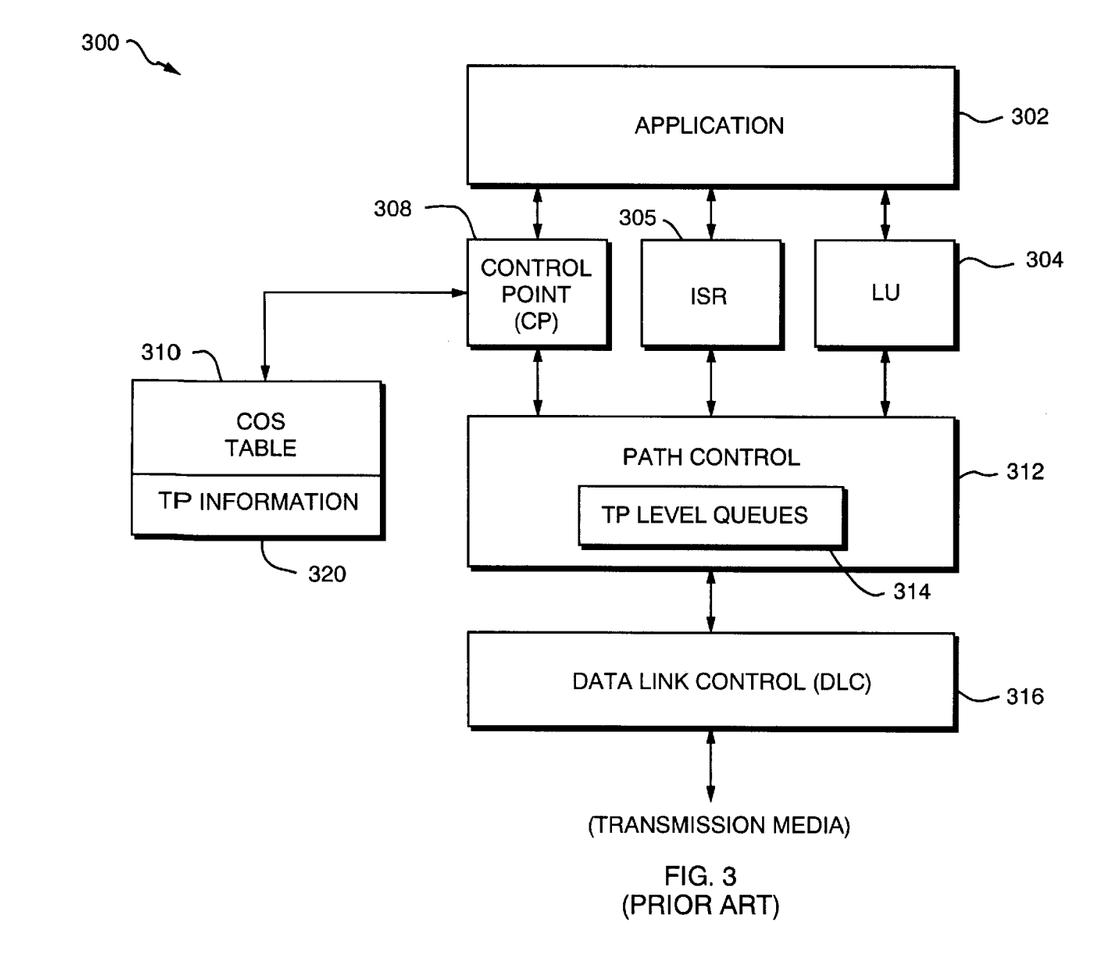
FIG. 3 schematically illustrates the software architecture of an APPN node.

FIG. 3 illustrates the software architecture of a conventional APPN node 300. An application 302 executing on an APPN node acting as an end node (in the manner of, e.g., EN 202 of network 200) communicates with another end node (e.g., EN 212) through a LU—LU session; the LU 304 within each end node functions as both a logical port for the application to access the network and as an end point of the communication session. The data exchange comprising the session generally passes through a path control module 312 and a data link control (DLC) module 316 of the node, the latter of which connects to various network transmission media.

When the APPN node 300 functions as an APPN router node (in the manner of, e.g., NN 206), an intermediate session routing (ISR) module 305 maintains a portion of the session in each "direction" with respect to an adjacent network node (e.g., NN 216 of network 200). During session establishment, path control 312 and ISR 305 are invoked to allocate resources for the session. With reference to FIG. 2, each NN 206, 216 allocates a local form session identifier for each direction of the session. Collectively, these individually established "local" sessions form the logical communication session between the LUs of the end nodes 202, 212.

When initiating a session, the application 302 specifies a mode name that is distributed to all APPN network nodes; the LU 304 in each node uses the mode name to determine the set of required characteristics for the session being established. Specifically, the mode name is used by the control point (CP) module 308 of each APPN node 300 to find a corresponding class of service (COS) as defined in a COS table 310. The CP coordinates performance of all APPN functions within the node, including management of the COS table 310. The COS definition in table 310 includes a priority level specified by transmission priority (TP) information 320 for the packets transferred over the session; as a result, each APPN network node is apprised of the priority associated with the packets of a LU—LU session. The SNA architecture specifies four TP levels: network priority, high priority, medium priority and low priority. Path control 312 maintains a plurality of queues 314, one for each TP level, for transmitting packets onto the transmission media via DLC 316.

Data link switching (DLSw) is a forwarding mechanism over an IP backbone network, such as the Internet. In traditional bridging, the data link connection is end-to-end, i.e., effectively continuous between communicating end stations; a frame originating on a source LAN traverses one or more bridges specified in the path over the LLC connection to the destination LAN. In a system implementing DLSw, by contrast, the LLC connection terminates at the first DLSw bridge or router. The DLSw device multiplexes the LLC connections onto a transport connection to another DLSw bridge or router. In this way, the individual LLC connections do not cross a wide-area network, work, thereby reducing traffic across this network; the LLC connections from the source LAN to the transmitting data link switch, and from the receiving data link switch to the destination LAN, are entirely independent from one another. Data link switching may be implemented on multi-protocol routers capable of handling DLSw as well as conventional (e.g., source-route bridging) frames. The DLSw forwarding mechanism is well-known and described in detail in Wells et al., *Request for Comment* (RFC) 1795 (1995).

Figure 4:
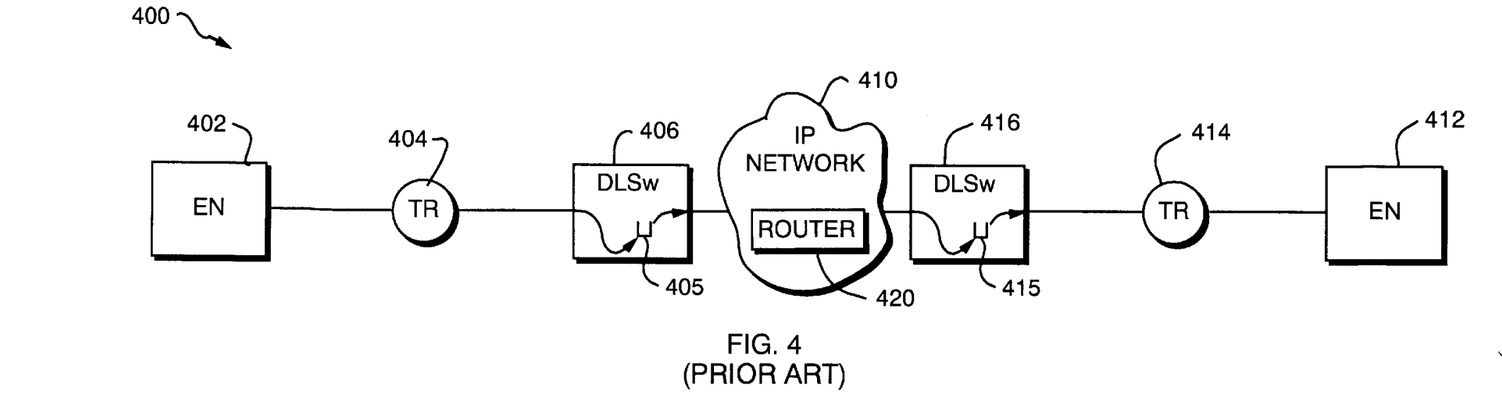
FIG. 4 schematically illustrates the primary components of a DLSw network.

In particular, a heterogeneous DLSw network is formed when two data link switches interconnect end nodes of the APPN network by way of the IP network; the switches preferably communicate using a switch-to-switch protocol (SSP) that provides packet "bridging" operations at the LLC (i.e., DLC) protocol layer. FIG. 4 illustrates a conventional DLSw network 400 comprising two exemplary DLSw switches 406, 416 interconnecting the ENs 402, 412 via an IP network 410. In accordance with the DLSw scheme, a lower-layer DLC connection is established between each EN 402, 412 and the corresponding data link switch 406, 416, where the connection terminates. In order to provide a complete end-to-end connection between the end nodes, the DLC connections are carried over a reliable, higher-layer transport mechanism, such as TCP sessions. Data link switches can establish multiple, parallel TCP sessions using known port numbers; all packets associated with a particular DLC connection typically follow a single, designated TCP session. Accordingly, data frames originating at a sending EN 402 are transmitted over a particular DLC connection along TR 404 to switch 406, where they are encapsulated within a designated TCP session as packets and transported over IP network 410. The packets are received by switch 416, decapsulated to their original frames, and transmitted over a corresponding DLC connection of TR 414 to EN 412 in the order received from EN 402 by switch 406. The communicating switches 406, 416 are usually called "peers."

Each data link switch typically maintains a list of DLSw-capable routers (i.e., routers capable of acting as, and interacting with, data link switches). After the TCP connection is established, SSP messages are exchanged to establish the capabilities of the two communicating switches. Once this "capabilities exchange" is complete, the switches employ SSP messages to establish end-to-end circuits over the transport connection, and thereafter to exchange data.

In FIG. 4, end nodes 402, 412 are equivalent APPN nodes. This arrangement, while typical, is not universal. Some networks are organized hierarchically to accommodate different classes of station. For example, a data server such as a credit-card authorization center may maintain a very large database of information for access by many (perhaps thousands) of remote end stations. In such circumstances, the DLSw peers are segmented into two classes: remote peers for connecting to remote end stations, and data-center peers for aggregating data traffic at the data center. Thus, a hierarchical network of this type will usually have a large number of remote peers and a relatively small number of data-center peers.

Each data-center peer can simultaneously accommodate (i.e., exchange data with) only a limited number of remote peers. Furthermore, because of the need for high reliability and constant availability of access to the data center by the remote end stations, the network usually includes backup data-center peers (in addition to the minimum number of "primary" data-center peers necessary to routinely handle all the remote peers). In this way, if one of the primary peers fails, or is nearing capacity and exhibiting diminished throughput, the backup peer can be activated to handle the traffic. Peer redundancy improves network stability and prevents excessive switching times.

One method of accommodating backup peers is for a backup peer to be assigned to each primary peer, with each remote peer maintaining a simultaneous connection to the data-center primary peer and its designated backup peer. If the primary peer fails, traffic continues through the backup peer. This arrangement, of course, is expensive in requiring a dedicated backup peer for each primary peer, and wasteful in that the backup peer may be unneeded much (if not most) of the time. Moreover, if both the primary and the backup are for some reason unavailable (e.g., the primary is overloaded and the backup has failed), the connection from the remote peer will be refused, and the remote end station will effectively be excluded from access to the data center.

Efforts to use a single data-center peer as a backup for multiple primary peers do not necessarily reduce overall costs. Even with this type of arrangement, each backup peer must have sufficient memory and computational capacity to handle the load should all primary peers to which it is assigned simultaneously fail. Moreover, assuming constantly active backup peers (so that each remote peer constantly maintains a primary and a backuppeer), the bandwidth load is unchanged regardless of the number of backup peers handling the traffic.

Backup arrangements can also be envisioned that do not require simultaneous two-way transport connections between a remote peer and both a primary and a backup data-center peer. For example, the backup can be configured to accept the circuit upon detection of a failure condition in the primary. But even this approach wastes bandwidth and computational resources, since the backup must effectively be in constant communication with the primary in order to facilitate seamless transition to the new circuit; for example, the backup must be able to pick up the frame count for each LLC session acquired from the failed primary. The net effect may be little different from simultaneously active peer-to-peer connections.

SUMMARY OF THE INVENTION

The present invention achieves high levels of redundancy and responsivness in a hierarchical, asymmetrically organized network without the need for routing devices that are idle most of the time. In accordance with the invention, backup peers are organized into a "pool" of available devices that are activated as necessary. Preferably, each remote peer is assigned to a series of backup devices in a hierarchical order of preference. During the capabilities exchange between the remote peer and the primary peer, the backup list is provided to the remote peer. If the primary peer fails (or if the rate of message exchange falls below some predetermined threshold), the remote peer can use the backup information to access a backup peer from the pool. The invention allows each backup peer to be assigned to multiple remote peers, with the total number of backup peers determined by aggregate backup utilization (rather than simply assigning an individual backup peer to each primary peer regardless of whether such a high level of redundancy is justified). In order to avoid concentrating responsibilities with any particular peer in the pool, each backup peer is assigned to primary peers at different hierarchical preference levels (to the extent possible) in order to evenly distribute the backup burden. Because the size of the backup pool depends on the expected failure rate rather than the absolute number of primary peers, the number of backup peers can be substantially less than would be necessary in a fully redundant system. Moreover, this arrangement ensures a higher level of redundancy since a remote peer will be able to gain access to the data center even if its primary and first-choice backup peer fail.

In accordance with the invention, therefore, at least one backup routing device from the pool is designated for each local routing device; each such backup device is capable of establishing a circuit between the central computational facility and the remote peer upon failure of the primary peer. In one embodiment, the backup peers are physically distinct devices dedicated exclusively to backup—that is, so long as all primary peers to which a backup peer is paired are operative, the backup does not facilitate communication between the remote peers and the central computational facility. Alternatively, however, some or, depending on utilization of the local peers (relative to their capacities) and the expected failure rate of the primary peers, all of the backup peers may in fact be other primary peers; that is, the network may be configured without dedicated backup peers by having the primary peers reciprocally designate one another as backup peers, evenly diffusing backup responsibilities.

Generally, the backup peers assigned to a particular primary peer vary with the remote peer; that is, the various remote peers capable of connecting to a particular primary peer may not receive the same list of backup peer devices during the capabilities exchange. Preferably, lists of backup peers are specific to particular remote devices, with the aim of minimizing the costs of connection (should one become necessary) between a remote peer and the backup peers to which it is paired.

BRIEF DESCRIPTION OF THE DRAWINGS

The invention description below refers to the accompanying drawings, of which.

DETAILED DESCRIPTION OF THE PREFERRED EMBODIMENTS

Figure 5:
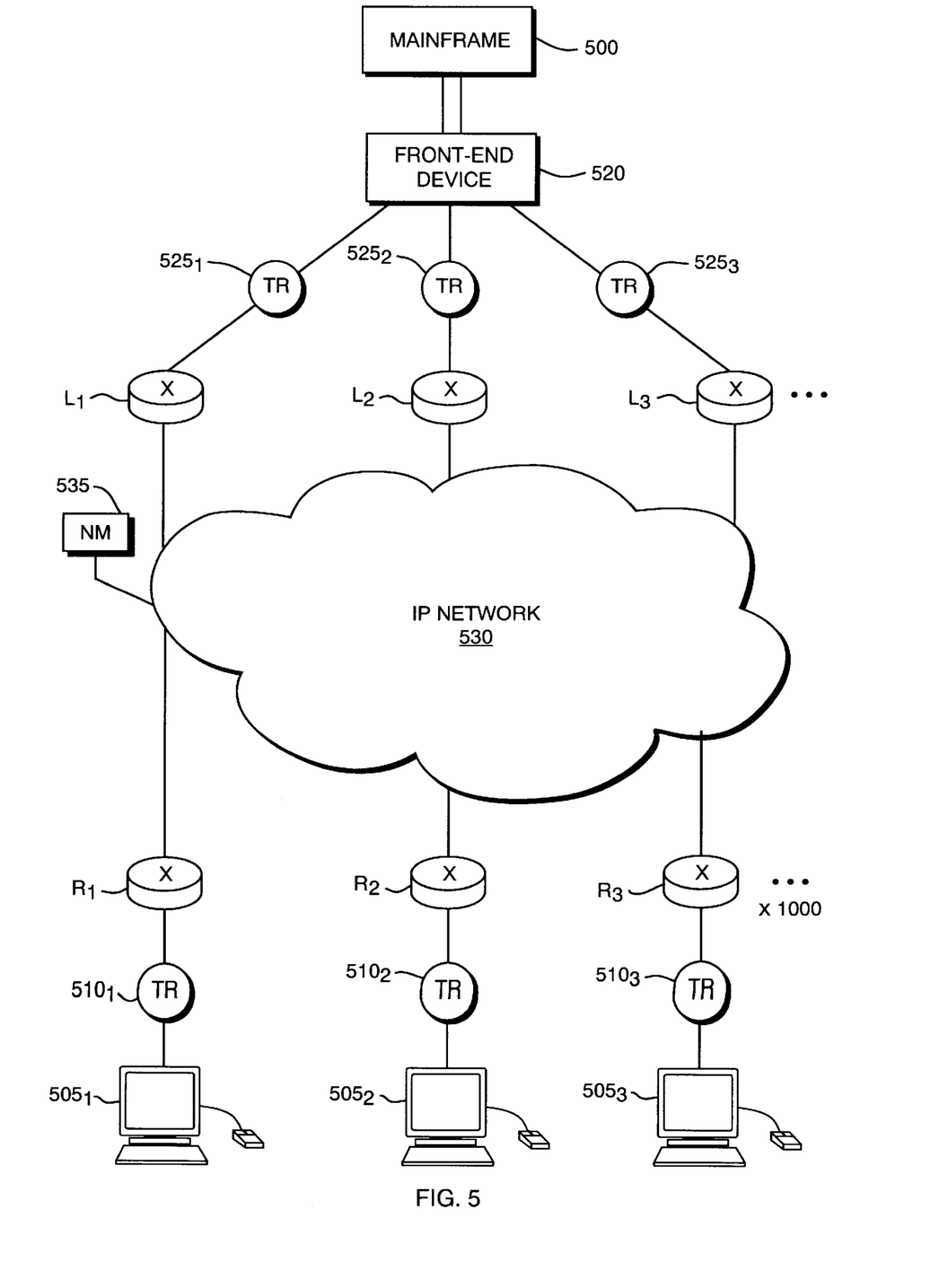
FIG. 5 is a map of a computer network configured for remote access to a data center.

Refer first to FIG. 5, which illustrates the environment of the invention. In the most general terms, a central computational facility, such as a mainframe computer 500, is accessed by a large number of diverse, geographically distributed end stations or nodes representatively indicated at $505_1$, $505_2$, $505_3$; for example, mainframe 500 may be a credit-card data center, while end stations 505 may be point-of-purchase terminals at different department stores. The task of the remaining elements shown in the figure is to facilitate two-way data exchange between the mainframe 500 and the remote end stations 505.

Each illustrated remote end station 505 is connected to a local sub-network 510 (which may, for example, be a token-ring (TR) or other multicast network, or another DLSw-compatible network), which is, in turn, connected to other subnetworks by a routing device $R_1$, $R_2$, $R_3$. On the "local" side of the illustrated network, the mainframe 500 is connected to a front-end device such as a channel-attached router or communications controller 520. Remote access to mainframe 500 is facilitated by a series of local routing devices representatively indicated at $L_1$, $L_2$, $L_3$. These are connected to workstation 520 via respective subnetworks $525_1$, $525_2$, $525_3$. Although shown as TR networks, subnetworks 525 can, in fact, represent local-area or wide-area networks. Routing devices $L_1$–$L_3$ and $R_1$–$R_3$ can be geographically diverse, and may exchange data directly or, as illustrated, over other computer networks. As indicated in the figure, there are typically many more remote routing devices (e.g., on the order of thousands) than local routing devices (e.g., on the order of tens). The ratio of local to remote routing devices depends largely on the service capacities of the local devices (as discussed more fully below).

Figure 6:
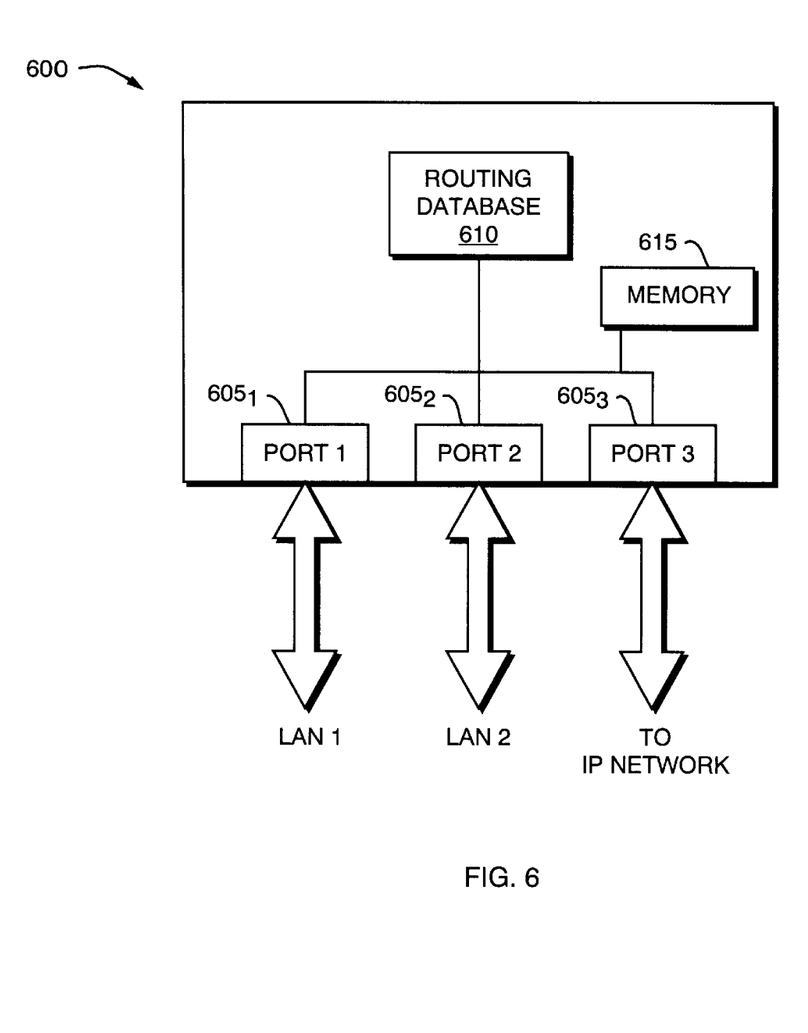
FIG. 6 schematically illustrates the primary components of a representative routing device.

Routing devices $L_1$–$L_3$ and $R_1$–$R_3$ may be bridges between LANs, routers between WANs, or, as shown in FIG. 5, APPN nodes also implementing DLSw and communicating over an IP network 530 (typically an IP-based private internetwork) managed by one or more network-management console workstations 535. A representative routing device 600 is shown in FIG. 6, and comprises a series of ports $605_1$, $605_2$, $605_3$, each connected to a different subnetwork or to the IP network, a routing database 610 containing a list of DLSw-compatible devices, and a memory module 615 (containing, inter alia, the various software modules shown in FIG. 3). Conventionally, routing database 610 contains a "station cache" that associates the various stations on the network with one of the ports 605. Not shown in the figure are conventional components such as a central processing unit, permanent storage, input/output hardware, and the bidirectional system bus interconnecting the various components.

In accordance with one embodiment of the invention, some of the local routing devices L act as primary peers, accepting and handling data traffic from the various remote routing devices R; others of the local routing devices L act as backup peers, handling traffic from remote devices R only when one of the primary peers fails or becomes overloaded. Accordingly, until that time, the backup devices either have no active peer connections or are peered to the remote devices to facilitate seamless transition.

Figure 7:
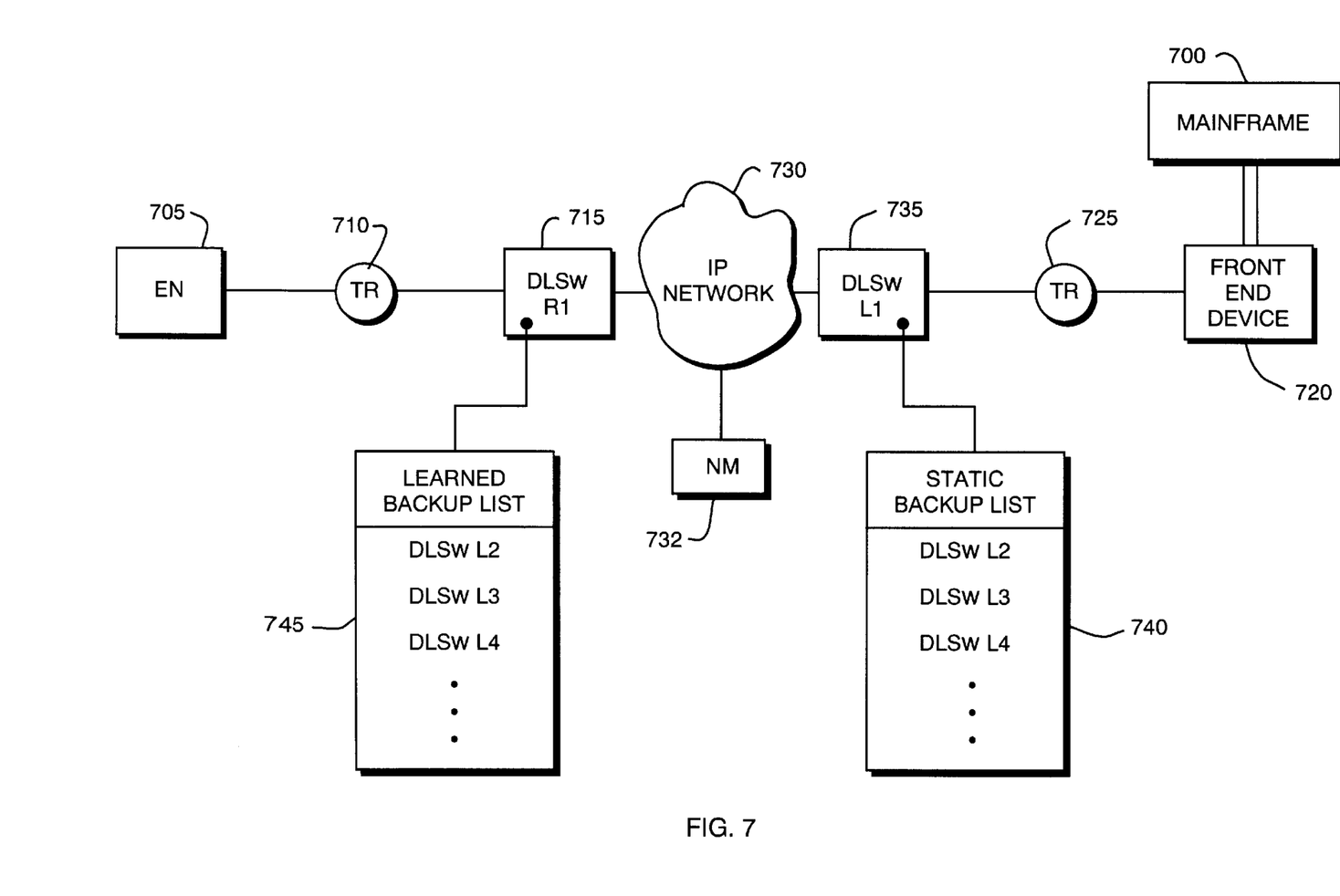
FIG. 7 schematically illustrates configuration of local and remote routing devices in accordance with the present invention.

The manner in which the backup system is organized and transitions to backup devices effected is shown in FIG. 7. Once again, a mainframe 700 is to be accessed by an end node 705. EN 705 is part of a subnetwork 710, which communicates with the IP network 730 (itself managed by a workstation 732) by means of a remote (from the perspective of mainframe 700) data link switch DLSw R1, indicated at 715. On the local side, the various subnetworks connected to mainframe 700 are managed by a front-end device 720. A representative subnetwork is connected to the IP network 730 by means of a local data link switch DLSw L1, indicated at 735. The connection between remote device 715 and the particular local device 735 is mandated by the routing database of remote device 715 (more specifically, its "remote peer definition"—i.e., the configuration statement that provides the path (IP address or direct interface) to a local peer). Typically, the routing database includes a preferred local peer device and one or more alternatives (e.g., with reference to FIG. 5, the routing database of $R_1$ may designate each of $L_1$–$L_3$ in an order of preference), in case the preferred device refuses connection. Which of the remote devices is listed as the preferred peer depends on the cost associated with the various remote peers and their physical locations, which determines the overall cost of telecommunication between EN 705 and mainframe 700; for example, it may be preferable to peer to a relatively high-cost local device if the overall telecommunications costs of data exchange, given the location of the remote device, are relatively low. This is discussed in greater detail below.

The routing database of local peer 735 also maintains a list 740 of backup peer devices, e.g., the series of local peers DLSw L2, DLSw L3, DLSw L4; the list comprises adequate information (e.g., IP addresses) to facilitate connection between the remote peer 715 and any of the listed backup peers. In accordance with the embodiment under discussion, these devices are physically distinct machines accessed upon failure or overload of a primary routing device. The list 740 may originate with remote peer 715 (as part of its remote peer definition), but preferably is instead stored in a memory partition of primary local peer 735 and provided to remote peer 715 during the capabilities exchange; remote peer 715 stores this acquired or "learned" list 745 in its own memory partition. For example, the "local" side of IP network 730 may include a series of primary peers and a smaller number of dedicated backup peers, each backup peer being designated by a plurality of the primary peers (and, consequently, the remote peers with which they communicate) in a hierarchical order of preference. By judiciously varying the backup-peer preference order—that is, the lists 740—among primary peers, no backup peer will bear a disproportionate burden. As the network grows, new backup peers are added; the ratio of backup peers to primary peers reflects the traffic-handling capabilities of the backup peers and the overall level of backup utilization (based, for example, on network statistics indicating a primary-peer failure rate). So long as the network contains fewer backup peers than primary peers, the approach of the invention results in efficiencies relative to one-primary, one-backup systems.

Designation of the various preference hierarchies can, most simply, be entered permanently into each local primary peer. Preferably, however, the list of backup peers for each primary peer is within the control of front-end device 720, which can vary backup assignments based on considerations of cost, traffic loads, or the detected failure of one or more backup peers. In either case, the remote peer is constrained to the backup peers specified in list 745, and in the order in which they are listed. (In this regard, it should be noted that primary peers may provide different backup list to different remote peers for cost-minimization or load-balancing purposes, as discussed below.)

Alternatively or in addition, however, remote peers can select among local backup peers based on cost information obtained during the capabilities exchange; indeed, this information can be used not only for backup purposes, but also to facilitate load balancing with respect to primary peers. For example, remote peer 715 can be configured to connect to local primary peer 735 and also to the remote peers on backup list 740. During the capabilities exchange, each of the local peers to which remote peer 715 connects provides cost data comprising both an "inherent" resource cost associated with the peer itself and a telecommunication cost for the connection. The resource cost associated with a particular peer (sometimes called the "box cost") represents, essentially, the cost to the network of a connection to the peer, and depends, for example, on its configuration and capabilities (for example, the more computationally powerful the machine and the more memory with which it is equipped, the smaller will be the cost) and the current traffic level through the device (so that high-traffic peers have higher costs than low-traffic peers). The costs associated with the various local peers bias the remote peer to the primary and backups that are optimal from the perspective of network efficiency and telecommunication cost; the remote peer is programmed to dynamically evaluate cost data, along with any other network-management information deemed relevant by the system designer, in order to select the proper local peers.

Variations to this approach are also possible. For example, instead of requiring remote peer 715 to connect to primary local peer 735 as well as the backup peers in order to obtain cost information for all relevant devices, that information can be continuously maintained and updated on primary peer 735, and provided to remote peer 715 in a single transmission during the capabilities exchange. In other words, the backup peers in list 740 regularly report cost information to primary peer 735, and peer 735 uses both this information and the known geographic locations of the backup peers and remote peer 715 to provide accurate cost information to remote peer 715 (or, instead, to define the list of backups provided to remote peers during capabilities exchange).

For truly seamless backup operation, of course, it would be necessary for remote peer 715 to be continuously connected to primary peer 735 and to a backup peer, thereby maintaining the frame count when communication is switched to the backup. But if a momentary loss of connection can be tolerated, redundant connections can be avoided completely. Should remote peer 715 lose is connection to primary local peer 735, it can simply attempt to connect to the first backup peer in list 740 (i.e., the "least-cost" backup peer or the hierarchically designated first backup) for access to mainframe 700. Conventionally, if a peer is incapable of supporting a circuit, it refuses connection; thus, if DLSw L2 refuses connection to remote peer 715, the latter simply attempts to peer with DLSw L3, and so on.

It is also possible to configure the local peers to provide greater information upon connection refusal. For example, a local peer can be programmed to briefly accept the unwanted peer connection (even if the load capacity of the local peer has been exceeded), and, before breaking the connection, to provide a reason code and a list of known backup peers along with relevant cost information. In this way, the cost information obtained by peer 715 during the capabilities exchange may be updated if the connection-refusing peer has more recent cost information concerning backup peers. This approach is especially useful in network configurations requiring backup peers to periodically report current load information not only to primary peers, but to backup peers as well.

In accordance with another embodiment of the invention, the backup peers are not necessarily physically distinct machines. Instead, at least some of the primary local peers also serve as backup peers; that is, these machines have sufficient capacity under ordinary operating conditions to service all or part of the traffic through another primary peer should it fail. Furthermore, the backup pool may consist only of such backup-ready primary peers, or may instead include some combination of dedicated backup peers and backup-ready primary peers. Because the burden that serving as a backup would impose on a primary peer is reflected in its cost, equipping the remote peers to evaluate costs in selecting a backup peer ensures that excessive loads are not experienced by any backup-ready primary peer.

Once again, the optimal number of backup peers (e.g., whether dedicated backup machines are necessary at all) is determined by the expected level of backup utilization and the traffic-handling capabilities of all primary peers eligible to act as backups.

It will therefore be seen that the foregoing represents a highly efficient approach to backup routing, particularly in a hierarchical, asymmetrically organized network. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a computer network comprising a plurality of remote routing devices and a plurality of local routing devices connected to a central computational facility, the remote and local routing devices being capable of establishing connections facilitating exchange of data between the remote routing devices and the computational facility by way of the local routing devices, a method of providing connection backup between a remote routing device and the computational facility, the method comprising:

a. designating, for each local routing device, at least one backup routing device capable of establishing an internetwork-level data-transfer connection between a remote routing device and the computational facility; and b. upon connection between a remote routing device and a local routing device, supplying the remote routing device with information identifying at least one designated backup local routing device to thereby facilitate an internetwork-level connection between the remote routing device and the computational facility by way of the at least one identified routing device.

2. The method of claim 1 wherein a capabilities exchange takes place upon connection between the remote routing device and the local routing device, the information-supplying step taking place during the capabilities exchange, the local and remote devices communicating by means of data-link switching.

3. The method of claim 1 wherein at least some of the backup routing devices are dedicated devices physically distinct from the local routing devices, the backup routing devices being fewer in number than the local routing devices.

4. The method of claim 3 wherein a plurality of backup routing devices is designated for each local routing device and each backup routing device is designated by a plurality of local routing devices, backup routing devices being designated by each local routing device in a hierarchical order of preference varying for at least some of the local routing devices so as to distribute backup responsibilities among the backup devices.

5. The method of claim 1 wherein at least some of the local routing devices also serve as backup routing devices.

6. The method of claim 1 wherein the connection-facilitating information provided to a remote routing device comprises a network address for each of a plurality of designated backup devices.

7. The method of claim 1 wherein a plurality of backup routing devices is designated for each local routing device, the connection-facilitating information originating with each local routing device.

8. The method of claim 7 wherein the designated backup routing devices are selected so as to minimize a cost of connection between the remote routing device and the backup routing devices.

9. The method of claim 8 wherein the backup routing devices each have a traffic level and a hardware configuration, the cost being based on the traffic level and the hardware configuration, and telecommunication charges for the connection between the remote routing device and the the backup routing devices.

10. The method of claim 7 wherein the designated backup routing devices are selected so as to balance traffic loads across the backup routing devices.

11. The method of claim 1 wherein a plurality of backup routing devices is designated for each local routing device, the connection-facilitating information originating, for each remote routing device, with the local routing device to which it is connected and the designated backup routing devices.

12. The method of claim 7 wherein a plurality of backup routing devices periodically report cost information to each local routing device, each local routing device designating backup routing devices based on the reported cost information.

13. The method of claim 1 wherein a plurality of backup routing devices is designated for each remote routing device, the connection-facilitating information originating with each remote routing device.

14. The method of claim 13 wherein a remote routing device chooses among the designated backup devices so as to minimize a cost of connection between the remote routing device and the backup routing devices.

15. The method of claim 13 wherein a remote routing device chooses among the designated backup devices so as to balance traffic loads across the backup routing devices.

16. For use in computer network having a plurality of remote routing devices and a plurality of local routing devices, an apparatus comprising:

a. a central computational facility to which the remote routing devices are connected, the remote and local routing devices being capable of establishing connections facilitating internetwork-level exchange of data between the remote routing devices and the computational facility by way of the local routing devices; and b. means for providing connection backup between a remote routing device and the computational facility, said means comprising:

i. means for designating, for each local routing device, at least one backup routing device capable of establishing an internetwork-level data-transfer connection between a remote routing device and the computational facility; and ii. means for supplying, upon connection between a remote routing device and a local routing device, the remote routing device with information identifying at least one designated backup local routing device to thereby facilitate an internetwork-level connection between the remote routing device and the computational facility by way of the at least one identified routing device.

17. The apparatus of claim 16 wherein the remote routing device and the local routing device are configured to perform a capabilities exchange upon connection therebetween, the connection-facilitating information being supplied during the capabilities exchange, the local and remote devices communicating by means of data-link switching.

18. The apparatus of claim 16 wherein at least some of the backup routing devices are dedicated devices physically distinct from the local routing devices, the backup routing devices being fewer in number than the local routing devices.

19. The apparatus of claim 18 wherein a plurality of backup routing devices is designated for each local routing device and each backup routing device is designated by a plurality of local routing devices, backup routing devices being designated by each local routing device in a hierarchical order of preference varying for at least some of the local routing devices so as to distribute backup responsibilities among the backup devices.

20. The apparatus of claim 16 wherein at least some of the local routing devices also serve as backup routing devices.

21. The apparatus of claim 16 wherein the connection-facilitating information provided to a remote routing device comprises a network address for each of a plurality of designated backup devices.

22. The apparatus of claim 16 wherein a plurality of backup routing devices is designated for each local routing device, the connection-facilitating information originating with each local routing device.

23. The apparatus of claim 22 wherein the designated backup routing devices are selected so as to minimize a cost of connection between the remote routing device and the backup routing devices.

24. The apparatus of claim 23 wherein the backup routing devices each have a traffic level and a hardware configuration, the cost being based on the traffic level and the hardware configuration, and telecommunication charges for the connection between the remote routing device and the backup routing devices.

25. The apparatus of claim 22 wherein the designated backup routing devices are selected so as to balance traffic loads across the backup routing devices.

26. The apparatus of claim 16 wherein a plurality of backup routing devices is designated for each local routing device, the connection-facilitating information originating, for each remote routing device, with the local routing device to which it is connected and the designated backup routing devices.

27. The apparatus of claim 22 wherein a plurality of backup routing devices are configured to periodically report cost information to each local routing device, each local routing device being configured to designate backup routing devices based on the reported cost information.

28. The apparatus of claim 16 wherein a plurality of backup routing devices is designated for each remote routing device, the connection-facilitating information originating with each remote routing device.

29. The apparatus of claim 28 wherein the remote routing devices are configured to choose among the designated backup devices so as to minimize a cost of connection between the remote routing device and the backup routing devices.

30. The apparatus of claim 28 wherein the remote routing devices are configured to choose among the designated backup devices so as to balance traffic loads across the backup routing devices.

31. In a computer network comprising a plurality of remote routing devices and a plurality of local routing devices connected to a central computational facility, the remote and local routing devices being capable of establishing connections facilitating exchange of data between the remote routing devices and the computational facility by way of the local routing devices, a computer storage medium containing executable instructional code, execution of the code facilitating connection backup between a remote routing device and the computational facility according to steps comprising:

a. designating, for each local routing device, at least one backup routing device capable of establishing an internetwork-level data-transfer connection between a remote routing device and the computational facility; and     b. upon connection between a remote routing device and a local routing device, supplying the remote routing device with information identifying at least one designated backup local routing device to thereby facilitate an internetwork-level connection between the remote routing device and the computational facility by way of the at least one identified routing device.

32. The medium of claim 31 wherein a capabilities exchange takes place upon connection between the remote routing device and the local routing device, the information-supplying step taking place during the capabilities exchange.

33. The medium of claim 31 wherein at least some of the backup routing devices are dedicated devices physically distinct from the local routing devices, the backup routing devices being fewer in number than the local routing devices.

34. The medium of claim 33 wherein a plurality of backup routing devices is designated for each local routing device and each backup routing device is designated by a plurality of local routing devices, backup routing devices being designated by each local routing device in a hierarchical order of preference varying for at least some of the local routing devices so as to distribute backup responsibilities among the backup devices.

35. The medium of claim 31 wherein at least some of the local routing devices also serve as backup routing devices.

36. The medium of claim 31 wherein the connection-facilitating information provided to a remote routing device comprises a network address for each of a plurality of designated backup devices.

37. The medium of claim 31 wherein a plurality of backup routing devices is designated for each local routing device, the connection-facilitating information originating with each local routing device.

38. The medium of claim 37 wherein the designated backup routing devices are selected so as to minimize a cost of connection between the remote routing device and the backup routing devices.

39. The medium of claim 38 wherein the backup routing devices each have a traffic level and a hardware configuration, the cost being based on the traffic level and the hardware configuration, and telecommunication charges for the connection between the remote routing device and the the backup routing devices.

40. The medium of claim 37 wherein the designated backup routing devices are selected so as to balance traffic loads across the backup routing devices.

41. The medium of claim 31 wherein a plurality of backup routing devices is designated for each local routing device, the connection-facilitating information originating, for each remote routing device, with the local routing device to which it is connected and the designated backup routing devices.

42. The medium of claim 37 wherein a plurality of backup routing devices periodically report cost information to each local routing device, each local routing device designating backup routing devices based on the reported cost information.

43. The medium of claim 31 wherein a plurality of backup routing devices is designated for each remote routing device, the connection-facilitating information originating with each remote routing device.

44. The medium of claim 43 wherein a remote routing device chooses among the designated backup devices so as to minimize a cost of connection between the remote routing device and the backup routing devices.

45. The medium of claim 43 wherein a remote routing device chooses among the designated backup devices so as to balance traffic loads across the backup routing devices.

\* \* \* \* \*